United States Patent

Coffey

[11] Patent Number: 5,850,654
[45] Date of Patent: Dec. 22, 1998

[54] FLUID-WETTED OR SUBMERGED SURFACE CLEANING APPARATUS

[76] Inventor: Daniel Coffey, 1710 Esplanade, No. H, Redondo Beach, Calif. 90277

[21] Appl. No.: 761,439

[22] Filed: Dec. 6, 1996

[51] Int. Cl.[6] .............................. E04H 4/16; A47L 13/02
[52] U.S. Cl. ...................... 15/1.7; 15/236.01; 15/236.07
[58] Field of Search ................................. 15/1.7, 236.01, 15/236.05, 236.06, 236.07

[56] References Cited

U.S. PATENT DOCUMENTS

| | | | |
|---|---|---|---|
| 502,233 | 7/1893 | Miller | 15/236.06 |
| 1,927,350 | 9/1933 | Schopp . | |
| 1,973,708 | 9/1934 | Heller . | |
| 2,188,114 | 1/1940 | Hubbard . | |
| 2,682,071 | 6/1954 | Linderoth . | |
| 2,980,937 | 4/1961 | Defries | 15/236.01 |
| 3,630,364 | 12/1971 | Johnston . | |
| 3,699,604 | 10/1972 | Hunt | 15/236.06 |
| 4,422,206 | 12/1983 | Brace et al. . | |
| 4,571,766 | 2/1986 | Goldman et al. . | |
| 4,682,558 | 7/1987 | Broersz | 15/1.7 |

FOREIGN PATENT DOCUMENTS 72755  3/1928  Sweden .
1172615  12/1969  United Kingdom .

*Primary Examiner*—Randall E. Chin
*Attorney, Agent, or Firm*—James M. Ritchey

[57] ABSTRACT

An apparatus for cleaning a selected surface, usually fluid-wetted or submerged, has a membrane element. The membrane element comprises a lower surface and an upper surface. The membrane element has a means associated with the upper surface which generates a force which, when in motion, causes the lower surface and the selected surface to be pressed more closely together, particularly embodied as a "wing" cross-sectional profile for added cleaning force and structural support. The lower surface is often textured to create and control fluid motion related inter-surfacial attractive and fluid shearing forces used in the cleaning motion. A perimeter scraping edge surrounds at least a portion of the membrane element. An elongated handle, usually a float, is affixed to the membrane element upper surface. In addition to a slightly concave outer region of the lower surface, the membrane element lower surface may have a concave central region and one or more fluid release apertures piercing the membrane element.

25 Claims, 8 Drawing Sheets

FLUID-WETTED OR SUBMERGED SURFACE CLEANING APPARATUS

BACKGROUND OF THE INVENTION

1. Field of the Invention

A device for converting motion into an inter-surfacial attractive force between the lower surface of the device and a selected surface where such force can be generated, controlled and used to clean or remove filth from an appropriately fluid-wetted or submerged surface is disclosed. More particularly, a hinged handle is coupled to a generally flat or slightly concave membrane element having both a cutting edge and a cleaning lower surface that adheres while in motion, during usage, to a fluid-wetted or submerged surface, thereby removing unwanted buildup such as algae, dirt and the like.

2. Description of the Background Art

Several types of aquarium cleaners exist in the prior art. Disclosed in U.S. Pat. No. 4,571,766 is a device for cleaning the interior surface of an aquarium and comprises a sponge cleaning element fastened to a headpiece that includes a non-rusting scraper. A handle extends from the headpiece and terminates in a planter element.

An ice scraper is related in U.S. Pat. No. 4,422,206. Included in the apparatus is a concavo-convex cleaning head that has two arcuate scraping edges, two radial slots that introduce sufficient resiliency for the head to fit to the contours of a curved surface, and an extending handle. The head flexes only as much as the slots allow. The underside of the head contacts the surface only at the scraping edges. The rigidly attached handle provides pressure for the scraping edges to function. A cleaning device for utilization with toilet bowls is presented in U.S. Pat. No. 1,927,350. An applicator is attached to a handle. The applicator is fabricated from material that permits a slight deformation to allow the head to mold to surface contours of the toilet bowl. Specifically, the applicator is of inverted cup form providing a flexible top wall, a slightly deformable annular wall or lip and providing an interior space open at the bottom. A suitable detergent or soap element fits within the interior space.

A complex window cleaning device is described in U.S. Pat. No. 1,973,708. Combined are a suction cup with a mechanical sealing and releasing means and a cleaning member such as pad or squeegee. The suction cup stabilizes the device for the other elements to function. The apparatus is designed to work on the surface of a air exposed window.

A semi-rigid cleaning scraper having an irregular concave lower surface is disclosed in U.S. Pat. No. 2,188,114. The device also serves as a shovel or scoop. The semi-rigid head is affixed to a handle. During usage the head distorts slightly to adapt to the form of irregular surfaces.

U.S. Pat. No. 2,682,071 exhibits a portable implement for use in connection with the wiping and polishing of plane surfaces. A polishing cloth fits over a flexible head member. In use, the flexible head member and polishing cloth contour to the shape of an underlying surface.

A bladed cleaning apparatus for aquariums is related in U.S. Pat. No. 3,630,364. An elaborate vacuum means is included for removing scraped particles.

Swedish Patent No. 72,755 shows an implement used to clean toilet bowls, bath tubs, and the like. A handle is rigidly affixed to a head having a concave lower surface and a sub-perimeter edge. The foregoing patents reflect the state of the of which the applicant is aware and are tendered with the view toward discharging applicant's acknowledged duty of candor in disclosing information which may be pertinent in the examination of this application. It is respectfully submitted however, that none of these patents teach or render obvious, singly or when considered in combination, applicant's claimed invention.

SUMMARY OF THE INVENTION

An object of the present invention is to disclose a submersible or fluid-wetted surface cleaning device that converts the relative motion of closely proximate surfaces into pressure (force per unit area) which acts approximately perpendicular to the direction of the motion and generates an inter-surfacial attractive force between those surfaces by systematically thinning the layer of fluid between the moving surfaces where such inter-surfacial attractive force causes the device to strongly press against or adhere to a fluid-wetted or submerged surface while in motion during usage and removes unwanted materials from the fluid-wetted or submerged surface.

Another object of the present invention is to relate an underwater cleaning apparatus that grips the fluid-wetted surface of a wall of an aquarium or equivalent surface by means of fluid shearing forces, surface tension, hydrostatic, and fluid-dynamic forces generated and controlled during its motion over the selected surface to be cleaned.

A further object of the present invention is to present a fluid-wetted surface, submerged, or underwater cleaning apparatus that grips the wetted surface of a wall of an aquarium or other appropriate fluid-wetted planar surface by means of an adhering membrane element and removes unwanted materials by action of both a cutting or scraping edge and a scouring lower surface of the membrane element.

Still another object of the present invention is to describe a fluid-wetted surface or underwater cleaning apparatus that grips the surface of a wall of an aquarium or other fluid-wetted planar surface by means of an adhering membrane element that may have its attractive forces generated, controlled, or mediated by means of the shape of the upper surface which generates a force, hereinafter "Additional Cleaning Force" which causes the generally planar or flat or slightly concave lower surface and the selected surface to be pressed more closely together and/or either a specially textured lower surface, concave central region of a lower surface of the membrane element, or by a plurality of fluid passing apertures that penetrate the membrane, or combination thereof.

Yet a further object of the present invention is to furnish a simple, inexpensive, and easily manufactured cleaning apparatus that effectively cleans a fluid-wetted or underwater surface and clings to that fluid-wetted or underwater surface by means of inter-surfacial attractive forces, surface tension, hydrostatic, and/or fluid dynamic and fluid shearing forces generated by motion of the membrane over the selected surface during usage of the device.

Disclosed is an apparatus for cleaning a fluid-wetted or submerged surface that comprises a membrane element. The membrane element itself comprises a lower surface, an upper surface, and means for structural support associated with the upper surface. Usually, the lower surface of the membrane element is generally planar or flat to slightly concave in form and textured or roughened to facilitate creation, control, and moderation of inter-surfacial attractive forces and an abrasive cleaning action against the submerged or fluid-wetted surface. Optionally, the lower surface contains a generally flat to slightly concave outer region (about >0° to about 10°) and a concave central region (more extensively concave than the outer slightly concave region or about 1° to about 30°) that aids in the cleaning action of the apparatus. Another optional embodiment comprises one or more fluid release apertures piercing the membrane element. Usually, the structural support means comprises a central post or pin or at least one slotted ring and more commonly a plurality of concentric, slotted rings, barriers or walls (which may be circles, squares, triangles, etc.), which rise in height so as to form the cross-section of a fluid-mechanical "wing", trapping fluid behind each wall and forcing fluid to rise over the membrane, and which operates during its motion through the fluid, as a means which generates a force which causes the lower surface and the selected surface to be pressed more closely together, creating external "Additional Cleaning Force". Additionally, a perimeter scraping edge surrounds at least a portion of the membrane element. Further included is an elongated handle affixed to the membrane element's upper surface. The handle is ether rigidly affixed or secured in a hinged manner to the membrane element's upper surface. Generally the handle is hollow and acts as a floatation and motion imparting means for the apparatus.

Other objects, advantages, and novel features of the present invention will become apparent from the detailed description that follows, when considered in conjunction with the associated drawings.

BRIEF DESCRIPTION OF THE DRAWINGS

FIG. 5 is a partial cross-sectional view taken along line 5—5 seen in FIG. 4 and shows the aperture penetrating the membrane element.

DESCRIPTION OF THE PREFERRED EMBODIMENT

Figure 1:
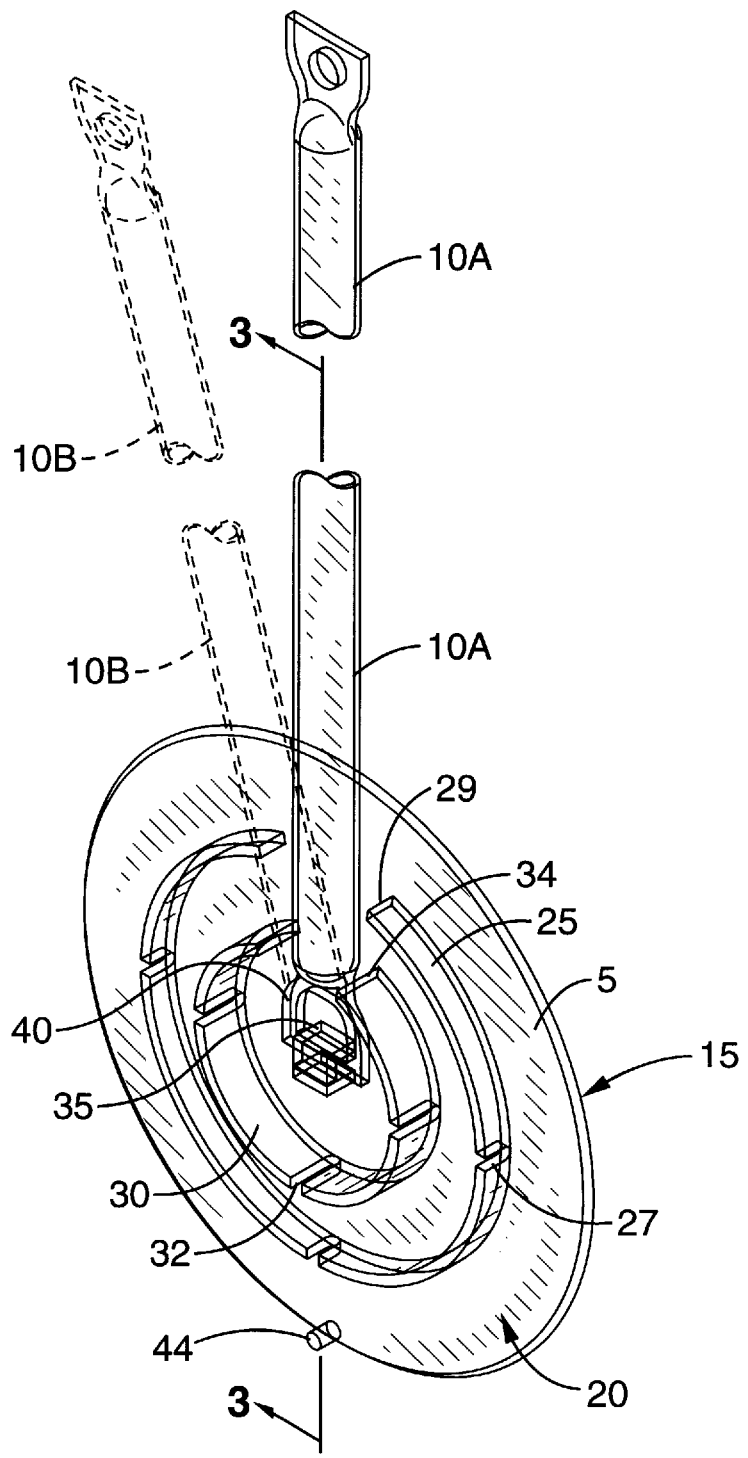
FIG. 1 is a perspective view of one embodiment of the subject invention showing hinged movement of the handle.

The subject apparatus functions to clean selected surfaces that are usually fluid-wetted or submerged under a fluid, generally water. Although aquarium wall surfaces are common for the selected surface, other surfaces include windows, boat bottoms, containers, tanks, airplane exteriors (with a supply of fluid), and any submerged or fluid-wetted surface with a reasonably large radius of curvature. The subject apparatus comprises a membrane element that is of any desired shape, usually disk shaped or round in form, but other geometric configurations are possible including triangular, square, pentagonal, hexagonal, and the like.

The edge of the membrane element and the lower surface of the membrane element are the cleaning structures that scrape, and press against or scour, respectively, the selected surface for cleaning. The lower surface may be smooth or textured to assist in the inter-surfacial abrasive cleaning action between the membrane and the selected surface. Further, the lower surface may be generally planar or flat to slightly concave in form. The term "slightly concave" implies that the lower surface may extend inward or away from the surface to be cleaned to a limited extent and is usually about >0° to about 10°. The slightly concave lower surface is not extensive enough to produce a typical "suction cup" type interaction with the selected surface, but is designed to facilitate the cleaning action during motion of the membrane over the selected surface to be cleaned.

The upper surface of the membrane has a connection point for the handle and usually a means for generating and controlling additional cleaning force when submerged, and structural support. Generally, concentric rings, barriers or walls are present which increase in height towards the center of the membrane. The increasing height walls, barriers, or rings retain fluid behind them and thereby form the cross-section of and act as a fluid-mechanical "wing" structure which increases the force of the membrane on the selected surface during motion of the membrane when passing through a fluid on the selected submerged or wetted surface. The additional cleaning force strongly influences the membrane to remain continuously adhered to the selected surface. Clearly, if liquid does not cover the upper surface then little or no additional cleaning force is generated by the cross-sectional "wing" structure, yet the inter-surfacial cleaning force of the lower surface is still present by virtue of the fluid related forces generated during motion.

The subject device utilizes and controls, a variety of forces, including, surface tension and a fluid dynamic force set up in fluids and their boundary layers when they are sheared by and between two surfaces during the closely proximate motion of the membrane over the selected surface. The inter-surfacial force theoretically maximizes, for a given velocity of the membrane relative to the selected surface, when the two surfaces (membrane element lower surface and the selected surface to be cleaned) are perfectly flat and separated by an extremely thin layer of fluid of a given viscosity. If the membrane lower surface is not perfectly flat but slightly concave, the fluid layer is thicker and certain inter-surface fluid eddy fields are established between the moving surfaces which tend to diminish and control the inter-surfacial attractive force and act to moderate what is otherwise a very intense force. If the separation layer of fluid is too thin, the inter-surfacial attractive force between the two fluid-wetted surfaces can become so great that movement of the membrane element ceases.

The raised thin walls, barriers, or rings are one means for creating an "additional cleaning force", an external force tending to press the lower membrane surface against the selected surface, by forming the cross-section of a fluid-mechanical "wing" which, when moved through the fluid, presses the membrane lower surface more strongly against the selected fluid-wetted or submerged surface (commonly glass or plastic in an aquarium or other suitable covering) which, in turn, expels fluid from between the membrane and the selected surface, which further thins the fluid layer between the moving surfaces, which, again, increases the inter-surfacial attractive force. The inter-surfacial attractive force also varies as a function of the relative velocity of the moving surfaces and the viscosity of the liquid. The combination of external and inter-surfacial forces press the respective surfaces together which further thins the inter-surfacial fluid layer by expelling fluid out from between the surfaces and thus repeatedly increases the inter-surfacial attractive force. In effect, the subject device has or embodies a positive feedback system which, if unchecked by the textured underside or other controlling or moderating means (see below), will literally lock up on the selected surface and not move, except intermittently.

To control and moderate the inter-surfacial attractive force generated in the fluid between the two moving surfaces, several approaches are utilized, separately and in combination. First, the texture of the lower membrane surface is altered to control the fluid thickness, amount of fluid mechanical, fluid eddy and inter-surfacial attractive forces. Second, alterations that influence the thickness of the inter-surface liquid layer are varied such as at least one fluid passing aperture penetrating the membrane element or a central concave region on the lower membrane surface, which acts like a pump to remove liquid from between the selected surface and the planar portion of the membrane element, thereby thinning the fluid layer and increasing the inter-surfacial attractive force. Third, the height and shape of the rings, barriers, or walls forming the cross-section of the fluid mechanical "wing" on the upper surface may be changed (for example, higher walls, barriers, or rings generate an increased external force pressing the surfaces together, thinning the fluid layer, and increasing the inter-surfacial attractive force in the thin layer of fluid between the two surfaces.). Actually, the cross-sectional profile and shape of the upper surface of the membrane may be altered in any appropriate manner to influence the "Additional Cleaning Force" associated with the upper-surface (external fluid, mechanical, or other force pressing the lower surface against the selected surface).

Figure 2:
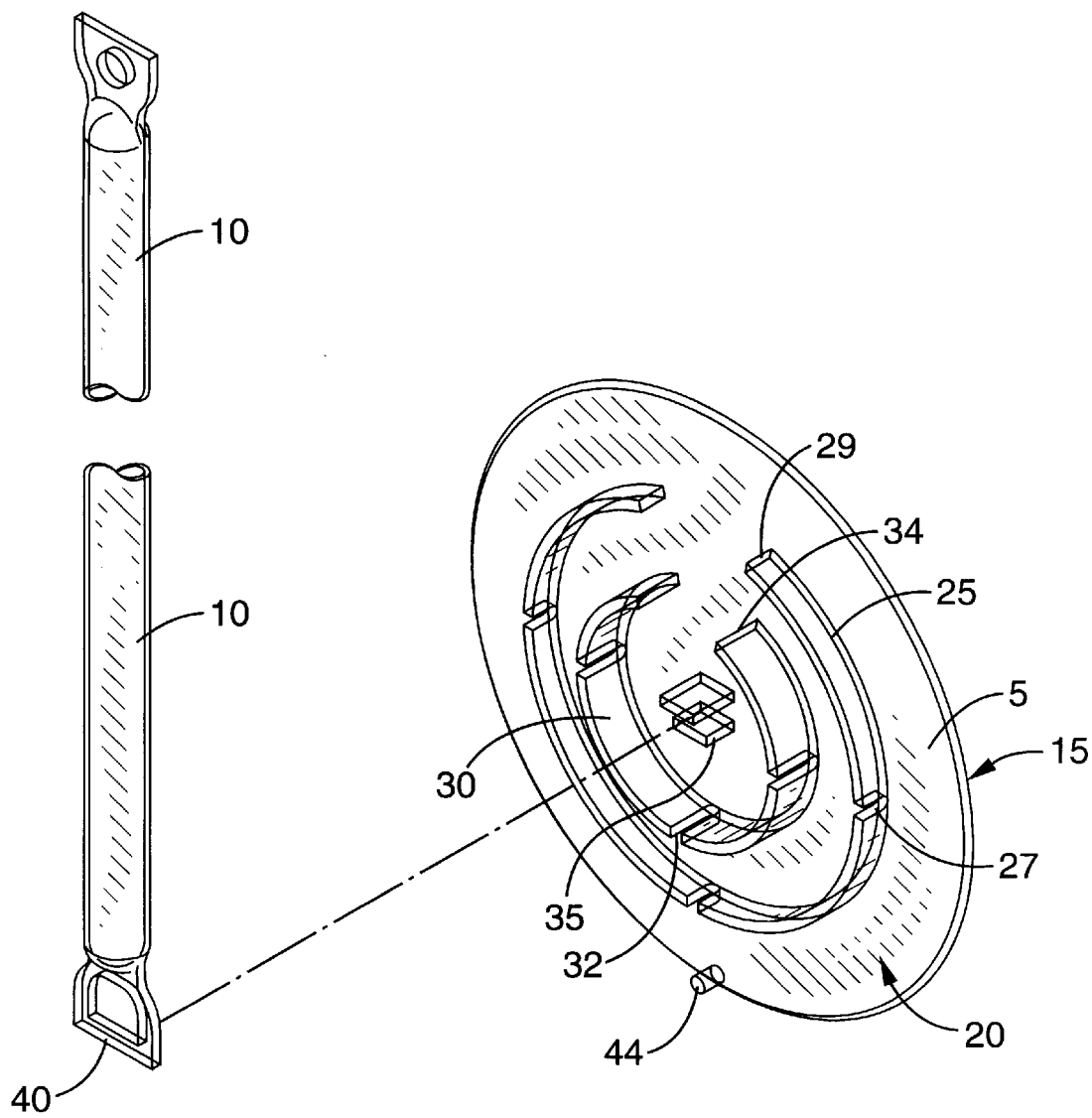
FIG. 2 is an exploded view of the subject invention depicted in FIG. 1 showing the handle component separated from the membrane element.
Figure 3:
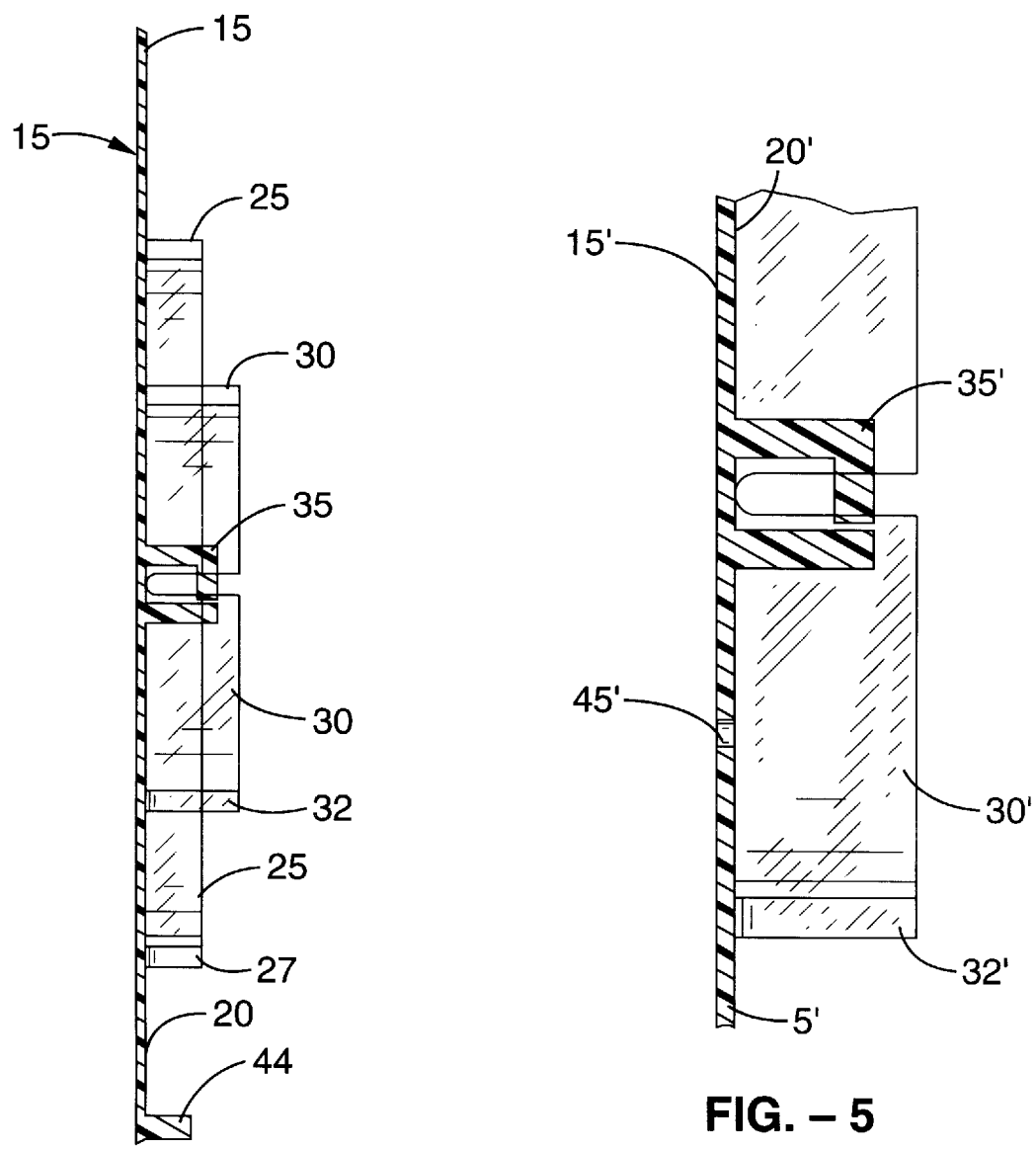
FIG. 3 is a cross-sectional view of the membrane element shown in FIG. 1 (taken along line 3—3) and FIG. 2.

Referring now to FIGS. 1–11, there are shown preferred embodiments of a surface cleaning apparatus. Although equivalent surfaces are within the realm of this disclosure, usually, the selected surface to be cleaned is a submerged or fluid-wetted surface such as a glass or plastic aquarium wall surface, window, or the like. As shown in FIGS. 1 and 2, one embodiment of the subject invention comprises a membrane element 5 and a handle 10 (10A indicates the handle 10 pivoted against the membrane element 5 and 10B denotes a hinged motion displacement for the handle 10 away from the membrane element, as described in detail below). The membrane element 5 has a lower surface 15 and an upper surface 20 (see FIG. 3). The lower surface is essentially planar or flat or slightly concave and is configured as a means of generating surface adhesion, boundary layer, and inter-surfacial forces due to motion that causes surface adhesion between the membrane lower surface 15 and the selected surface to be cleaned.

The membrane lower surface 15 may be textured so as to create and control adhesive forces and variation in the thickness of the fluid layer between surface 15 and the selected surface. Typically, surface 15 texture consists of nominally closed irregular flattened cavities approximately $5/10,000$ inches deep, separated by irregular flattened plateaus. However, numerous variations on the texture shape, size, and depth may be used to control the fluid forces acting on the membrane and the average thickness of fluid between the lower surface 15 and the selected surface.

Cleaning enhancing means are provided in the form of shaping the membrane element 5 into any shape which tends to press the lower surface 15 against the selected surface when moved through a fluid, often shaped like a "wing" cross-sectional area. Usually, the added cleaning enhancing-means also functions to introduce added structural stability to the membrane element 5. A preferred manner of producing the "wing" shape is to utilize a series of rings, barriers, or walls with gradually increasing height 25 and 30 which partially contains fluid between the barriers and causes additional fluid to rise or abruptly change direction over the upper surface when the membrane is in motion, thereby imparting a force which presses the lower surface toward the selected surface. Two rings, barriers, or walls 25 and 30 are depicted in the figures, but one or more than two rings, barriers, or walls are considered to be within the purview of this disclosure and may be utilized to decrease or increase, respectively, the external forces pressing the lower surface and the selected surface together, thereby partially controlling the inter-surfacial attractive force between the membrane element and the selected surface to be cleaned.

Within each ring, barrier, or wall 25 and 30 are slots 27 and 32 to release pressure and to permit the membrane to flex. To accommodate the handle 10 (when pivoted against the membrane element 5) larger or wider slots 29 and 34 are provided.

Generally, the membrane element 5 is fabricated from natural or synthetic polymeric materials such as standard plastics and the like by injection molding, pressing, and similar techniques.

The handle 10 pivots from a flat position 10A into an elevated position 10B by means of a hinged connection point. Although any equivalent hinge attachment means are acceptable, the depicted hinge means comprises a membrane hinge point 35 and a mating receiver 40 on the handle. Commonly, once the handle receiver 40 is positioned within the membrane hinge point 35 a means for affixing it in that location is utilized such as melting the material from which the membrane receiver 35 is fabricated to create a seal holding the handle receiver 40 in a pivoting coupling to the upper surface 20 of the membrane element 5.

Generally, the handle 10 is formed from natural or synthetic polymeric materials or from metals and metal alloys, woods, and the like. Shown in FIGS. 1, 2, and 4 is a handle 10 (and 10', where single, double, triple, or quadruple primes indicate equivalent or additional components in further embodiments) that is sealed hollow plastic and serves as a floatation and motion means for the subject device.

Proximate the outer perimeter of the upper surface 20 is a gripping projection 44 that is utilized to lift the subject element 5 from the surface that is being cleaned. A user may find that the lower surface 15 is so tightly adhered to the surface being cleaned-that for removal a finger-hold is needed near or at the outer perimeter of the upper surface 20. The projection 44 may be located anywhere near or along the perimeter edge and, like the other rings, barriers or walls, may be used to control the force lifting or pressing down on the membrane 5 near the edge when passing through the fluid, thereby tending to thicken or thin the fluid layer between the lower surface 15 and the selected surface.

Figure 4:
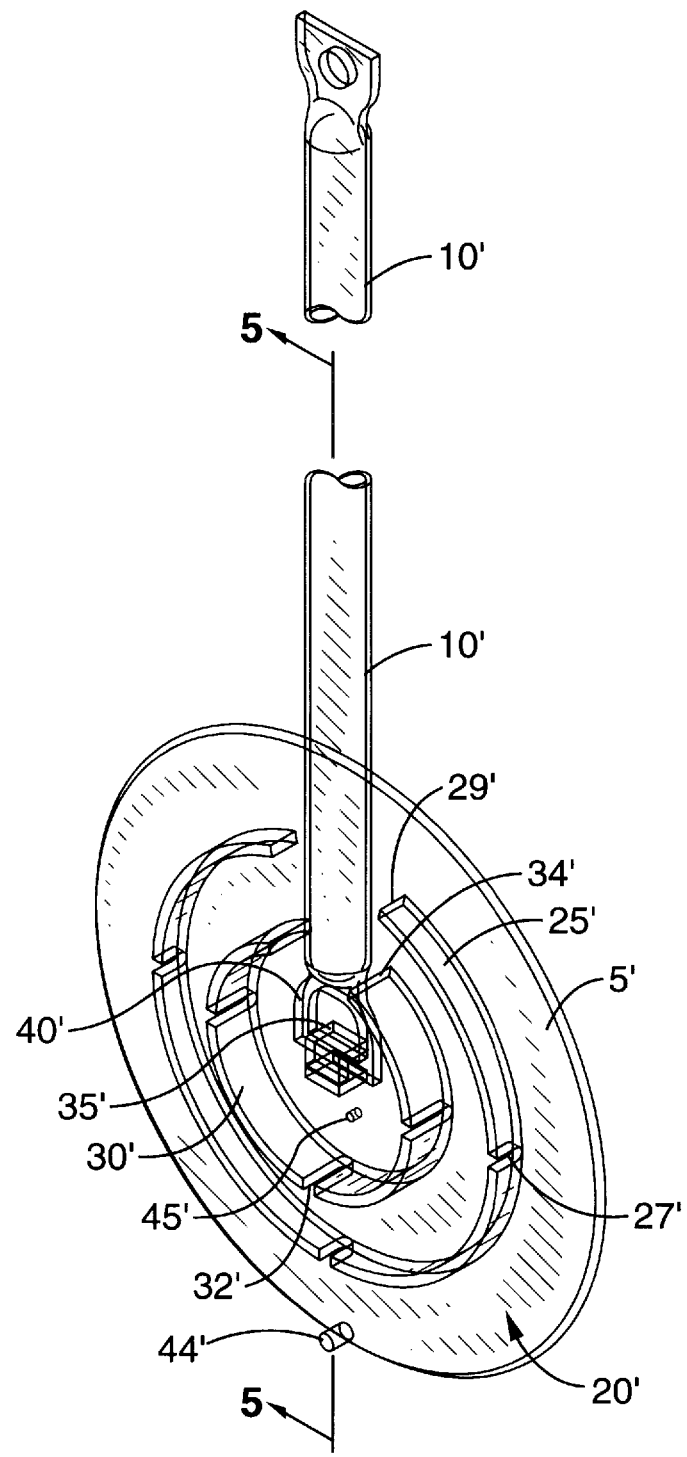
FIG. 4 is a perspective view of another embodiment of the subject invention showing a membrane element having a plurality of apertures penetrating the membrane element.

Another embodiment of the subject invention is seen is FIGS. 4 and 5. The primes indicate equivalent components to those shown for the first embodiments of the subject invention. In this embodiment, one (shown) or a plurality (not shown) of apertures 45' is included. The aperture 45' penetrates the membrane element 5' from the lower surface 15' to the upper surface 20'. The aperture 45' moderates the amount of force that is created between the membrane lower surface 15' and the selected surface to be cleaned by allowing fluid to escape and enter more freely. The aperture 45' is often $10/1000$ of an inch in diameter however, other diameters of lesser and greater dimensions are contemplated to decrease or increase fluid flow, respectively.

Figure 6:
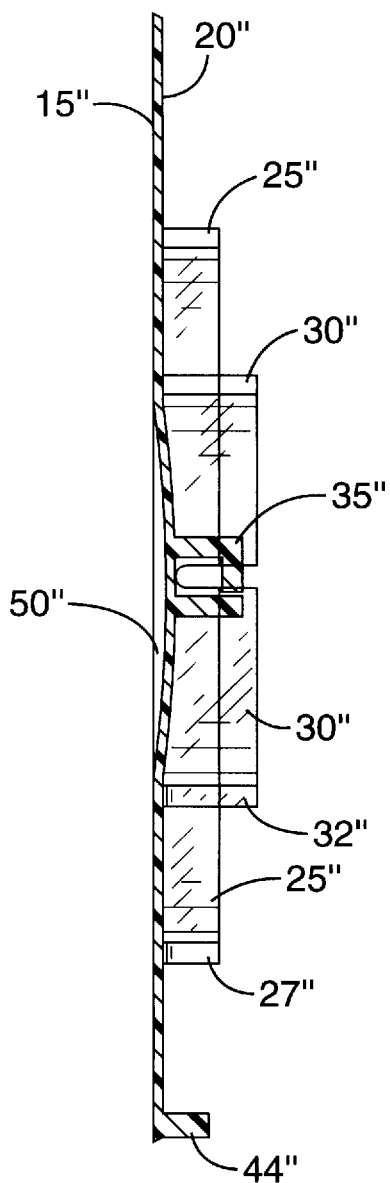
FIG. 6 is a cross-sectional view of another embodiment of the membrane element showing a concave central region with an essentially planar outer portion of the membrane element.

Another embodiment of the subject invention is seen in FIG. 6. A central concave region 50" is provided that is usually about $20/1000$ to about $50/1000$ of an inch in depth. Surrounding the central concave region 50" is the usual flat to slightly concave remainder of the lower surface 15". As indicated above, the central concave region 50" is utilized to adjust the amount of force exerted between the lower membrane surface 15" and the selected surface to be cleaned. Since the handle is connected at the membrane hinge point 35" when the device is used, a slight pumping action is created in the membrane as the handle imparts a torquing force on hinge point 35" as it twists and pivots during movement forward, backward, up, and down for cleaning. The pumping action expels fluid, hastening the fluid layer thinning between the surfaces during movement.

Figure 7:
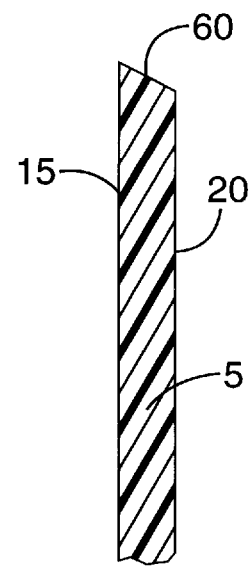
FIG. 7 is a partial cross-sectional view of the edge of the membrane element showing the slightly angled edge of the membrane.

FIG. 7 indicates a usual edge 60 (an equivalent edge 60 is found on all of the embodiments) configuration in which the edge 60 is slightly angled (approximately 5° from normal, other angles between 0° and 60° or more are acceptable) to produce a form better suited for molding, cutting or scraping. Although the angled edge 60 is preferred, a vertical orientation will function satisfactorily.

Figure 8:
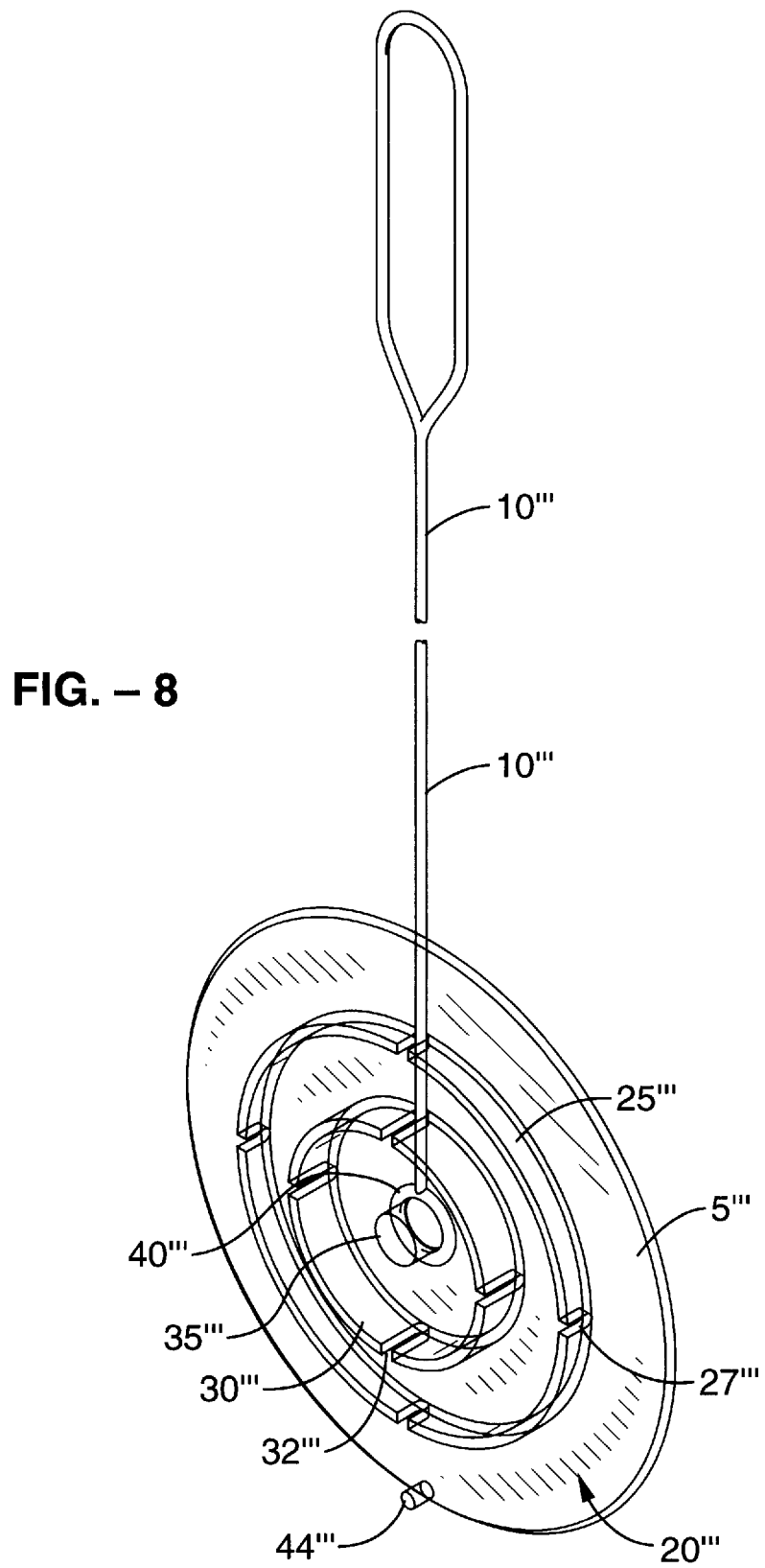
FIG. 8 is an additional embodiment of the subject invention in which a handle is rigidly or semi-rigidly affixed to the membrane element's upper surface.
Figure 9:
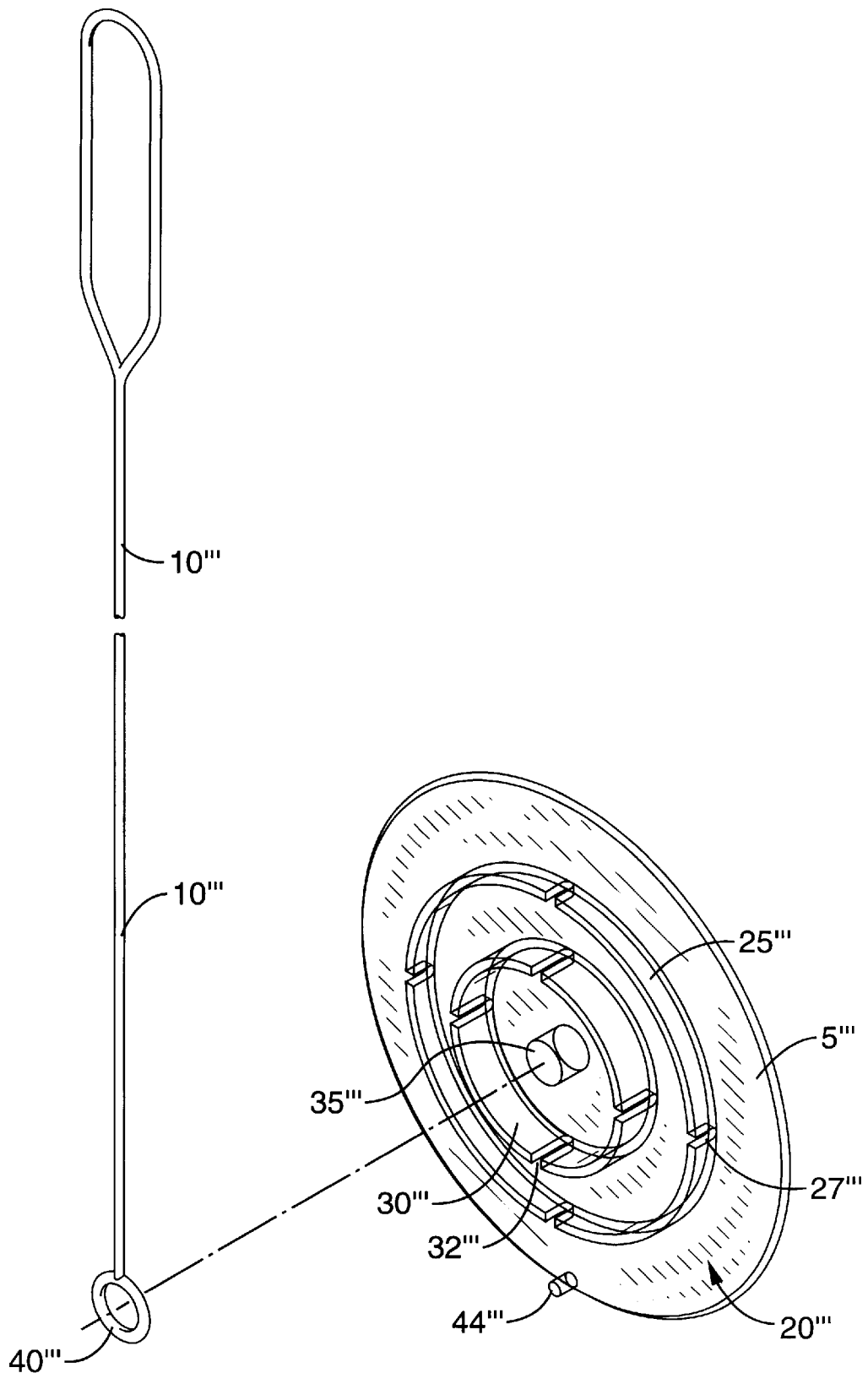
FIG. 9 is an exploded view of the embodiment shown in FIG. 8.

FIGS. 8 and 9 disclose one more embodiment of the subject apparatus. Here the handle 10''' is affixed to the membrane element 5''' via a nonhinged configuration. The membrane attachment point 35''' is often a projection that accepts the handle receiver 40''' and is then melted or similarly altered to hold the handle 10''' in place.

Figure 10:
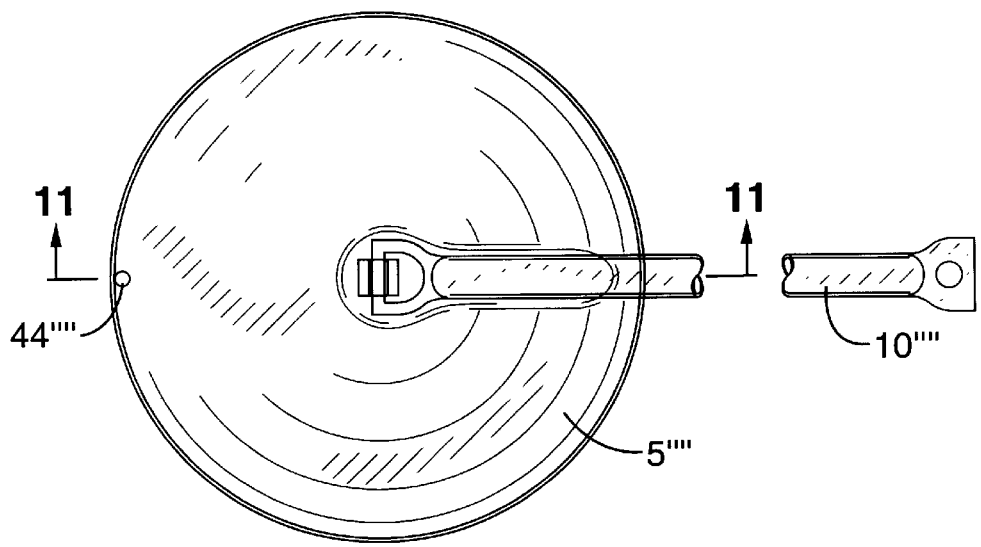
FIG. 10 is a perspective view of another embodiment of the present invention.
Figure 11:
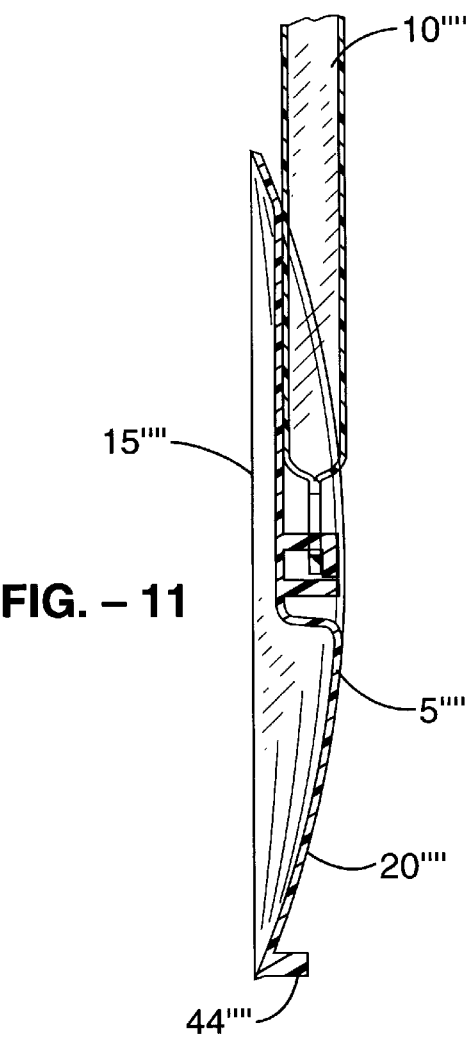
FIG. 11 is a cross-sectional view taken along line 11—11 of the embodiment of the present invention shown in FIG. 10.

FIGS. 10 and 11 depict an additional embodiment of the subject invention. In this embodiment, the membrane element 5'''' (four primes indicate equivalent components to those described above for the first embodiment) has a solid "wing" cross-sectional profile. The lower surface 15'''' is generally planar while the upper surface 20'''' is curved to create a "wing" cross-sectional profile to generate force pressing the surfaces together. The interior of the produced "wing" may be solid or hollow, but the upper surface 20'''' is generally a smooth construct with none of the interrupting walls, barriers or rings found in the other embodiments above that create the "wing" effect. The exact radius of curvature for the upper surface 20'''' is variable and may be altered to generate more or less external force pressing the lower surface 15'''' and the selected surface to be cleaned together during movement of the subject device through the fluid.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. An apparatus for cleaning a selected surface, comprising:
    a) a membrane element, comprising:
        i) a lower surface configured as a means for generating and controlling an inter-surfacial cleaning force associated with said lower surface while said membrane element is in motion;
        ii) an upper surface;
        iii) means for generating and controlling additional cleaning force which causes said lower surface and the selected surface to be pressed more closely together while said membrane element is in motion and for structural support associated with said upper surface;
        iv) a perimeter scraping edge surrounding at least a portion of said membrane element; and
    b) an elongated handle affixed to said membrane element upper surface.

2. An apparatus for cleaning a selected surface according to claim 1, wherein said lower surface is textured to facilitate an abrasive cleaning action against the selected surface.

3. An apparatus for cleaning a selected surface according to claim 1, wherein said lower membrane surface contains a concave central region.

4. An apparatus for cleaning a selected surface according to claim 1 wherein said handle is rigidly affixed to said membrane element upper surface.

5. An apparatus for cleaning a selected surface according to claim 1, wherein said handle is hinged to said membrane element upper surface.

6. An apparatus for cleaning a selected surface according to claim 1, wherein said handle acts as a flotation and motion inducing means.

7. An apparatus for cleaning a selected surface according to claim 1, further comprising at least one fluid release aperture piercing said membrane element.

8. An apparatus for cleaning a selected surface according to claim 1, wherein said means for generating and controlling additional cleaning force and structural support comprises at least one ring associated with said upper surface.

9. An apparatus for cleaning a selected surface according to claim 1, wherein said means for generating and controlling additional cleaning force and structural support comprises a plurality of concentric rings associated with said upper surface.

10. An apparatus for cleaning a selected surface according to claim 9, wherein said plurality of concentric rings increase in height toward a center of said membrane element.

11. An apparatus for cleaning a selected surface according to claim 1, wherein said means for generating and controlling additional cleaning force and structural support comprises said membrane element having a wing cross-sectional profile.

12. An apparatus for cleaning a selected surface according to claim 1, wherein said membrane lower surface is generally planar.

13. An apparatus for cleaning a selected surface according to claim 1, wherein said membrane lower surface is concave.

14. An apparatus for cleaning a fluid-wetted or submerged surface, comprising:
    a) a membrane element, comprising:
        i) a generally planar to slightly concave lower surface configured as a means for generating and controlling a cleaning force associated with said generally planar to slightly concave lower surface while said membrane element is in motion;

ii) an upper surface;

iii) means for generating and controlling an additional cleaning force which causes said generally planar to slightly concave lower surface and the selected surface to be pressed more closely together while said membrane element is in motion and for structural support associated with said upper surface; and iv) a perimeter scraping edge surrounding said membrane element and b) an elongated handle hinged to said membrane element upper surface.

15. An apparatus for cleaning a fluid-wetted or submerged surface according to claim 14, wherein said generally planar to slightly concave lower surface is textured to facilitate both moderation of attractive forces by controlling a fluid thickness in a wetting fluid and creating fluid eddy currents in said wetting fluid and an abrasive cleaning action against the fluid-wetted or submerged surface.

16. An apparatus for cleaning a fluid-wetted or submerged surface according to claim 14, wherein said generally planar to slightly concave lower surface contains a concave central region.

17. An apparatus for cleaning a fluid-wetted or submerged surface according to claim 14, wherein said handle is hollow and acts as a floatation and motion inducing means.

18. An apparatus for cleaning a fluid-wetted or submerged surface according to claim 14, further comprising at least one fluid release aperture piercing said membrane element.

19. An apparatus for cleaning a fluid-wetted or submerged surface according to claim 14, wherein said means for generating and controlling additional cleaning force and for structural support comprises at least one ring associated with said upper surface.

20. An apparatus for cleaning a fluid-wetted or submerged surface according to claim 14, wherein said means for generating and controlling additional cleaning force and for structural support comprises a plurality of concentric rings increases in height towards a center of said membrane element.

21. An apparatus for cleaning a fluid-wetted or submerged surface, comprising:

a) a membrane element, comprising:

i) a textured lower surface configured as a means for generating and controlling cleaning force associated with said textured lower surface while said membrane element is in motion;

ii) an upper surface;

iii) means for generating and controlling additional cleaning force which causes said textured lower surface and the selected surface to be pressed more closely together while said membrane element is in motion and for structural support associated with said upper surface, wherein said means for generating and controlling additional cleaning force and for structural support comprises a plurality of concentric rings, wherein said plurality of concentric rings increase in height towards a center of said membrane element; and iv) a perimeter scraping edge surrounding said membrane element and b) an elongated handle hinged to said membrane element upper surface, wherein said handle acts as a floatation and motion inducing means for the apparatus.

22. An apparatus for cleaning a fluid-wetted or submerged surface according to claim 21, wherein said textured lower surface contains a concave central region.

23. An apparatus for cleaning a fluid-wetted or submerged surface according to claim 21, further comprising at least one fluid release aperture piercing said membrane element.

24. An apparatus for cleaning a fluid-wetted or submerged surface according to claim 21, wherein each of said plurality of concentric rings has a slot of sufficient width to accept said handle within said width.

25. An apparatus for cleaning a selected surface according to claim 21, wherein said means for generating and controlling additional cleaning force and structural support comprises said membrane element having a wing cross-sectional profile.

\* \* \* \* \*